H. F. FRANKLIN.
INTERNAL COMBUSTION ENGINE.
APPLICATION FILED DEC. 6, 1916.

1,255,150.

Patented Feb. 5, 1918.
2 SHEETS—SHEET 1.

Inventor
Hubert F. Franklin
Attorneys.

UNITED STATES PATENT OFFICE.

HUBERT F. FRANKLIN, OF BROOKLYN, NEW YORK.

INTERNAL-COMBUSTION ENGINE.

1,255,150.  Specification of Letters Patent.  Patented Feb. 5, 1918.

Application filed December 6, 1916. Serial No. 135,324.

*To all whom it may concern:*

Be it known that I, HUBERT F. FRANKLIN, a citizen of the United States, residing in the borough of Brooklyn of the city of New York, in the State of New York, have invented certain new and useful Improvements in Internal-Combustion Engines, of which the following is a specification, reference being had to the accompanying drawings, forming a part hereof.

This invention relates to internal combustion engines of the four-cycle type. In engines of this character using rotary disk or piston valves the valves are generally exposed to compression and explosion pressures within the explosion chamber. The present invention has for one of its objects to protect the inlet and exhaust valves against such pressures within the working cylinders by interposing a master valve between the inlet and exhaust valves and the explosion chamber. In known constructions the clearances of the controlling valves must be very small to overcome leakage and therefore it is difficult to compensate properly for expansion and contraction of these valves after changing temperatures and yet prevent leakage. In the improved construction the fit of the controlling valves proper may be considerably looser than heretofore since these valves are not relied upon to maintain the pressures within the cylinder. The resulting advantage from this construction is that the manufacture of the parts is simpler, the lubrication easier, the liability to wear considerably reduced and the holding of the pressure insured.

In modern four-cycle engines using poppet valves the valve area is necessarily limited unless the engine is of the L or T-type in which case the effective pressure of the piston is necessarily reduced. In accordance with the present invention the master valve in the cylinder head may be substantially of the same diameter as the piston so that a maximum valve area is secured and the entire explosive charge is directly over the piston thereby preventing dissipation of the explosive force.

A further advantage of the improved construction is that by employing a single master valve for both the exhaust and the inlet ports in addition to the usual controlling valves, this master valve may have its speed reduced to one half the speed of the valves ordinarily employed. This valve is operated from the crank shaft and is so timed as to remain open during two successive strokes of the piston and remain closed during the other two successive strokes. In this way the valve is required to make only one complete reciprocation during one complete revolution of the crank shaft. Ordinarily the controlling valves of an engine are required to make one complete reciprocation during one half of a revolution of the crank shaft. A further object of the invention is to improve four-cycle engines by producing a higher mean effective pressure by simple and efficient devices which insure the automatic introduction into the cylinder of an explosive gas at a pressure higher than atmospheric pressure. So far as is known, the creation of an initial pressure in the working cylinder of an internal combustion engine has been accomplished heretofore only through the use of auxiliary compressors in which either the hydrocarbon or the air or both have been forced into the cylinder. In the improved engine the explosive mixture after its creation is forced into the working cylinder from a suitable reservoir under pressure created in the crank case by the downward movement of the piston. The valves in this engine are all so constructed and timed that while the usual cycle of operations is going on within the working cylinder the piston acting as a compressor with relation to the crank chamber is carrying on automatically the necessary operations for the formation, storage and introduction of the explosive mixture into the working cylinder. Suitable embodiments of the invention for attaining the stated results are shown in the accompanying drawings by way of illustration and the details of such embodiments will be pointed out at length in connection with the description of the drawings, in which—

Figure 1:
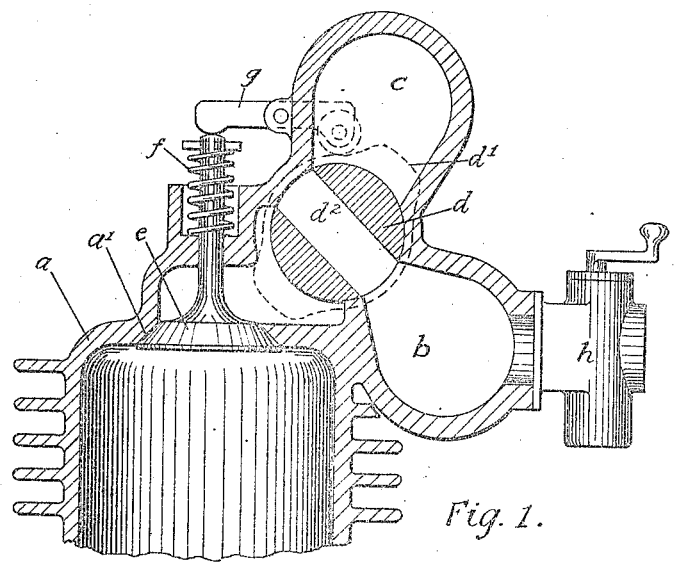
Figure 1 is a fragmentary view in section of a four cycle engine equipped with the improved master valve and with a single valve for controlling the inlet and exhaust.
Figure 2:
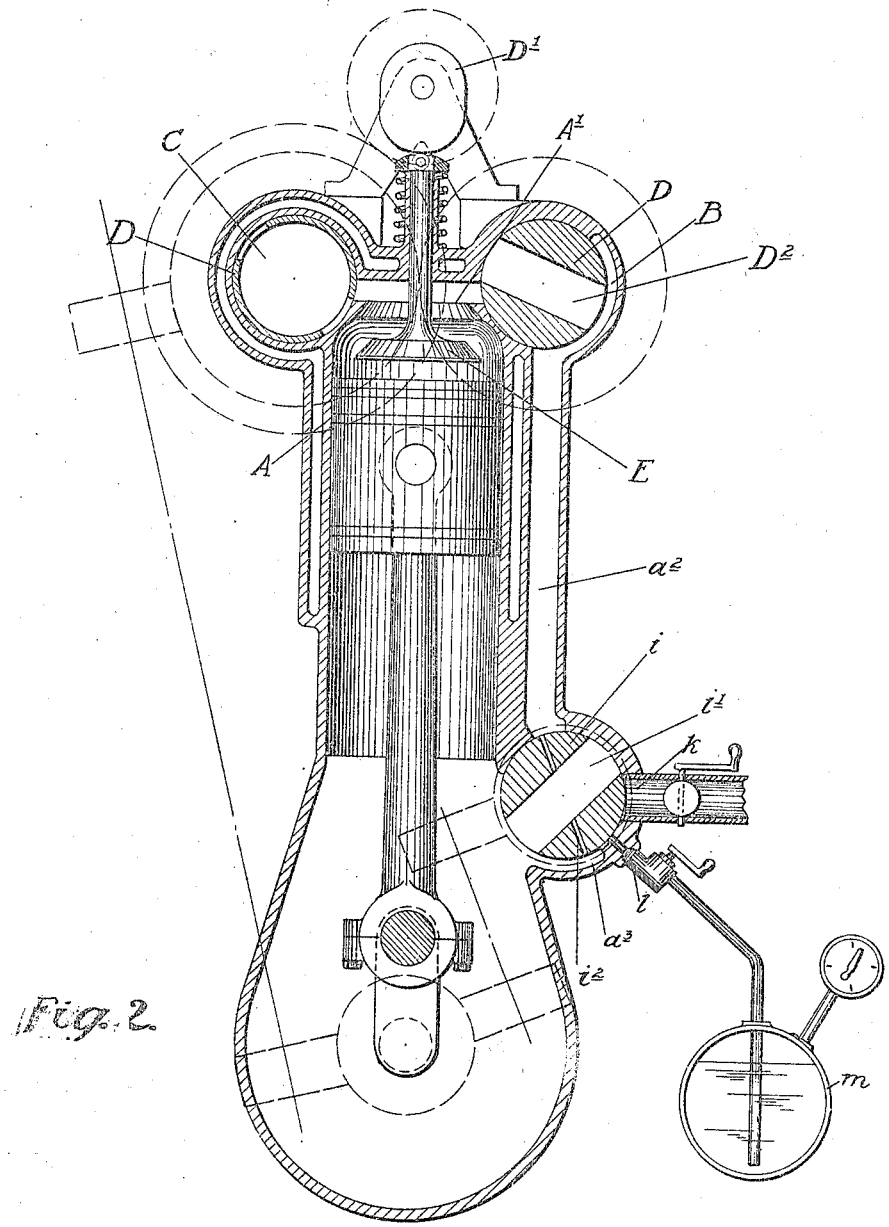
Fig. 2 is a view in vertical section taken through an engine having a somewhat modified valve control from that shown in Fig. 1 but operating on the same principle and including, in addition, devices for introducing the mixture into the cylinder under pressure by the action of the piston.

Before considering the complete engine illustrated in Fig. 2 a description of the improved valve control *per se*, as disclosed in Fig. 1, will be set forth so that an understanding of this phase of the invention alone will be gotten. As the description proceeds it will be evident that changes in the construction and arrangement of inlet and exhaust passages, valve chambers, actuating elements for the valves and the valves themselves may be made without changing the principle of operation which it is the province of this application to cover. As shown in Fig. 1, for instance, the cylinder $a$ is illustrated as having formed integral therewith inlet and exhaust passages $b$, $c$, respectively, both leading to a port $a'$ in the cylinder head and both controlled by a single rotary valve $d$ interposed in said passages. In the cylinder port $a'$, which may be of relatively great diameter to permit a quick inflow and discharge of gases, there is disposed a puppet valve $e$, the stem of which is operatively engaged by a spring $f$ and also by a rocker arm $g$ by means of which the valve may be unseated against the action of the spring. Movement is imparted to the rocker arm by means of a suitable cam $d'$ which may be mounted on the shaft with the rotary valve $d$, rotative movement being imparted to both the valve and the cam shaft through suitable gearing engaged operatively with the crank shaft in a manner which is well known, and which insures proper timing. The explosive mixture entering through the inlet chamber $b$ may be derived from any available source such as a carbureter, indicated conventionally at $h$.

In operation it will be evident that the master valve $e$ need only be unseated during the successive exhaust and intake strokes and that it may remain seated during the compression and working strokes of the piston. Since this valve controls both the introduction of fresh gases and the expulsion of burnt gases, its controlling cam $d'$ may be so designed as to drive it at a speed which would be said to be half of the speed of the crank shaft. Obviously such relatively slow speed of the controlling puppet valve is highly desirable and one which cannot be obtained in engines of known types in which the exhaust and the inlet valves must operate to effect the proper cycle of operations. The rotary valve $d$ rotates in a clockwise direction, as seen in Fig. 1, and is so timed that its controlling port $d^2$ will place the exhaust manifold $c$ and the inlet manifold $b$ in communication with the working cylinder at the intended time and when the master valve $e$ is open. When the master valve $e$ is closed it is evidently immaterial as to what position the valve $d$ assumes with relation to the ports $b$, $c$.

The advantages of the described construction reside in the slower speeds at which the valves may be operated, the great port area achieved by disposing a single master valve $e$ in the cylinder head, the compactness and simplicity of the construction, the reduction of the number of moving parts and the free and complete scavenging afforded the cylinder by reason of the unrestricted discharge passage. Another equally important result achieved is the complete protection of the inlet and exhaust valves from the heat and the high pressures created in the working cylinders. This protection permits these valves to be effectively cooled, of relatively light construction, free of carbon and, therefore, necessarily certain in operation and durable.

If conditions of use warrant the inlet and exhaust passages may each be provided with its own valve, as is brought out clearly in Fig. 2. In this figure, the cylinder A is formed with a port A' controlled by a master puppet valve E but the exhaust passage C is formed independent of the inlet passage B and each of these passages has its own valve D. These valves may differ by having the exhaust valve D formed as a tubular member to receive the dead gases, while the inlet valve D may be formed as a plug valve through which passes a port $D^2$ of suitable area. Rotative movement is imparted to both of the controlling valves D and to the actuating cam D' for the master valve E, by suitable driving connections with the crank shaft and all of these rotative elements may be intergeared, as indicated in dotted lines. The operation of the parts thus far described will be identical with the operation pointed out in connection with the embodiment shown in Fig. 1. The engine shown in Fig. 2 has embodied in it the improved means for bringing about compression of the explosive mixture at the time of its introduction into the cylinder under the influence of the piston so that a higher mean effective pressure may be acquired during operation of the engine. In principle, this portion of the invention is realized by introducing into the crank case by the suction caused therein by the upwardly traveling piston, the constituents of the explosive mixture, either separately or in association. This explosive mixture is then forced from the crank case by the downwardly traveling piston into a suitable storage chamber from whence it is subsequently forced into the working cylinder by the combined action of the suction therein and the pressure behind the mixture set up in the crank case by the succeeding down stroke of the piston. In the illustrated embodiment the storage chamber $a^3$ for the explosive mixture is formed integral with the walls of the cylinder A, although it is evident that this chamber might be formed independent of the cylinder. In passing it should be noted that the reason for forming the chamber integral with the cylinder wall is because of the cheapness of manufacture, compactness of parts and the advantageous heating of the mixture in the chamber by direct radiation. The communication between the storage chamber $a^2$ and the crank case is controlled by a suitable rotary valve $i$ in which is a diametrical port $i'$ adapted to establish and interrupt this communication periodically in a manner which will be evident. Communicating with the chamber $a^3$ for the valve $i$ is an air inlet passage $k$ and an oil injection passage $l$ through which oil may be forced under pressure from a feed tank $m$. In the valve $i$ are formed suitable ducts $i^2$ which register periodically with the oil passage $l$ for the introduction of oil.

Since, as is the fact, the valve $i$ is driven from the crank shaft of the engine, this valve will be timed synchronously with relation to the working piston and the controlling valves D for the inflow and exhaust of gases. Having seen from the description of the embodiment shown in Fig. 1 just how the inlet and exhaust valves coöperate with the master valve to control the cycle of operations, it will be sufficient to point out just how the supplementary valve $i$ is timed with relation to the piston for the control of the explosive mixture in its formation and in its introduction into the storage chamber $a^2$. The valve $i$ rotates in a counter clockwise direction. As the parts are shown in Fig. 2 the piston is about to begin its intake stroke. The inlet valve D is about to open. Before the piston finishes its intake stroke the port $i'$ will establish communication between the crank case and the storage chamber $a^2$ whereupon the gas in the crank case will be forced under pressure into said chamber. On the succeeding compression stroke of the piston, the port $i'$ will serve to establish communication between the air port $k$ and the crank case so that the piston will suck air into the crank case. On the working stroke of the piston the port $i'$ will again establish communication between the crank case and the working chamber. When the port $i'$ is in this position, the duct $i^2$ registers with the oil injection nozzle $l$ so that the air forced from the crank case through the port $i'$ into the storage chamber picks up the hydrocarbon received through the duct $i^2$ and forms therewith an explosive mixture which is stored in the chamber $a^2$. When the piston starts upward on its exhaust stroke a fresh supply of air is drawn into the crank case through the air port $k$. During the described operation, it will be understood that the inlet valve D is so timed with relation to the compressor valve $i$ that the intended operations will take place in proper sequence. In this connection it is to be noted that on the intake stroke of the piston the inlet valve D will permit the compressed charge in the chamber $a^2$ to flow into the working cylinder and that toward the end of the intake stroke communication will be established between the crank case and the chamber $a^2$ so that the compressive force of the piston will insure the delivery of the charge into the working cylinder at an initial pressure well above atmospheric pressure. Subsequent compression of this charge in the cylinder will insure a higher mean effective pressure for a given piston stroke.

Figure 3:
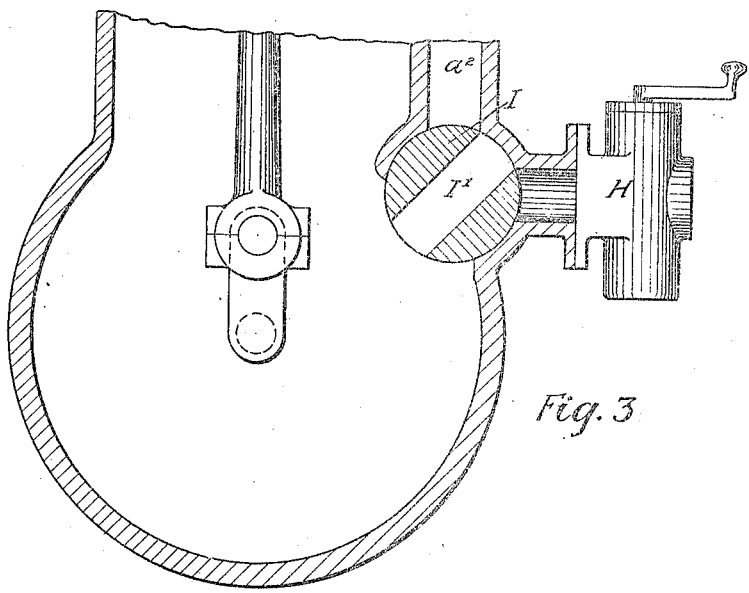
Fig. 3 is a fragmentary view in section of a portion of the crank casing of an engine provided with a slightly modified form of valve for controlling the introduction of the explosive mixture into the storage chamber therefor.

In Fig. 3 there is shown a somewhat modified form of valve for controlling the passage of the compressed mixture into the storage chamber $a^2$. In this construction it is supposed that the explosive mixture is formed at a carbureter indicated conventionally at H and that the charge received therefrom will be taken into the crank case through the rotary valve I and subsequently forced by the piston from the crank case into the storage chamber $a^2$ through the diametrical port I'. The valve I, is, as usual, properly timed with relation to the working piston and the other controlling valves D shown in Fig. 2. The same compression of the preformed charge is obtained as heretofore described with a resulting higher mean effective pressure.

Changes of form and arrangement as suggested hereinbefore may be made by one skilled in the art without changing the function of any of the parts either singly or in combination and all such changes of design are to be deemed within the spirit of this invention provided the stated objects are secured by the mechanical equivalents of the elements recited in the appended claims.

I claim as my invention:

1. In an internal combustion engine in combination with the exhaust valve, means to introduce the explosive charge into the crank case, a storage chamber in communication with the crank case and the working cylinder, an inlet valve to control the inflow of the charge to the working cylinder, a master valve interposed between said inlet valve, the exhaust valve and the working cylinder and controlling the flow of gases past said valves to the cylinder, and an independent valve to control the communication between the crank case and the storage chamber.

2. In an internal combustion engine, air and oil inlet passages communicating with the crank case, a storage chamber in communication with the crank case and the working cylinder, whereby the charge may be forced under pressure into the storage chamber from the crank case by the piston, a valve to control the communication between the storage chamber and the working cylinder and an independent rotary valve provided with passages for controlling the inflow of air and fuel into the crank case and the communication between the crank case and the storage chamber.

This specification signed this 4th day of December 1916.

HUBERT F. FRANKLIN.